United States Patent

Hayakawa et al.

[11] 4,302,332
[45] Nov. 24, 1981

[54] CENTRIFUGAL THICKENER

[75] Inventors: Noboru Hayakawa; Akaru Furusato; Toshio Saito; Tastuyuki Iwai, all of Tokyo, Japan

[73] Assignee: Nishihara Environmental Sanitation Research Corp., Ltd., Tokyo, Japan

[21] Appl. No.: 162,959

[22] Filed: Jun. 25, 1980

[30] Foreign Application Priority Data

Jul. 6, 1979 [JP] Japan .................................. 54-86209
Nov. 12, 1979 [JP] Japan .......................... 54-157385[U]

[51] Int. Cl.³ ...................... B01D 25/16; B01D 33/00
[52] U.S. Cl. .................................... 210/369; 210/378; 210/380.1
[58] Field of Search ...................... 210/360.1, 369, 377, 210/378, 380.1, 380.3

[56] References Cited

U.S. PATENT DOCUMENTS

| | | | |
|---|---|---|---|
| 2,893,562 | 7/1959 | McPhee et al. | 210/380.3 |
| 3,050,190 | 8/1962 | Siepe | 210/380.1 |
| 3,108,067 | 10/1963 | Dietzel et al. | 210/380.1 |
| 3,226,257 | 12/1965 | Steele et al. | 210/380.1 X |
| 3,283,910 | 11/1966 | Grieselhuber et al. | 210/380.1 |
| 3,311,240 | 3/1967 | Hirsch | 210/380.1 X |
| 3,520,418 | 7/1970 | Guinard | 210/380.1 X |
| 3,630,379 | 12/1971 | Sharples | 210/380.1 X |
| 3,955,754 | 5/1976 | Schaper | 210/380.1 X |
| 4,033,879 | 7/1977 | Natt et al. | 210/380.1 X |
| 4,133,770 | 1/1979 | Mercier | 210/360.1 X |

FOREIGN PATENT DOCUMENTS 856183 12/1960 United Kingdom ............. 210/380.1

Primary Examiner—Robert H. Spitzer
Attorney, Agent, or Firm—Bernard, Rothwell & Brown

[57] ABSTRACT

A centrifugal thickener comprising a truncated-cone shaped rotary barrel and a filter arranged along the inner surface of the rotary barrel, the rotary barrel having a vertical angle, of a truncated-cone shape formed by the internal surface thereof, of 40 to 80 degrees, the filter having a number of openings in size of 10 to 40 microns.

13 Claims, 26 Drawing Figures

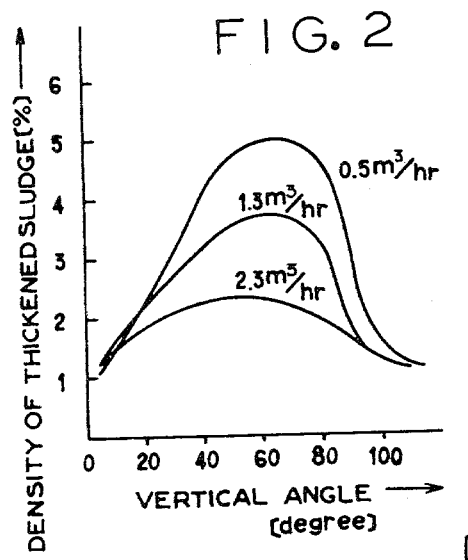
FIG. 2
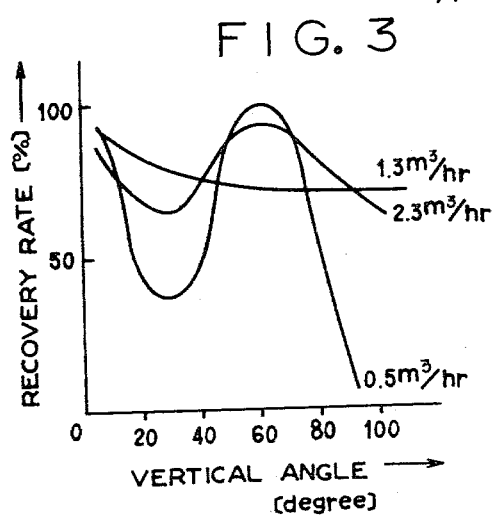
FIG. 3
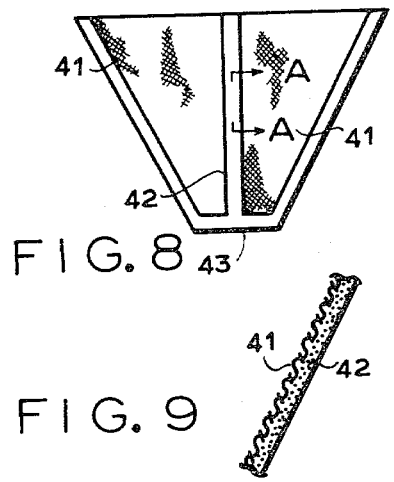
FIG. 8
FIG. 9
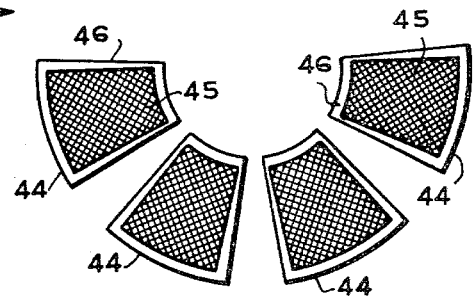
FIG. 10
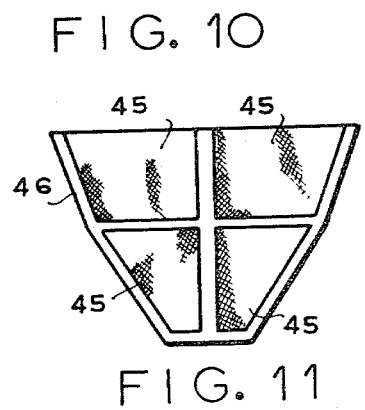
FIG. 11

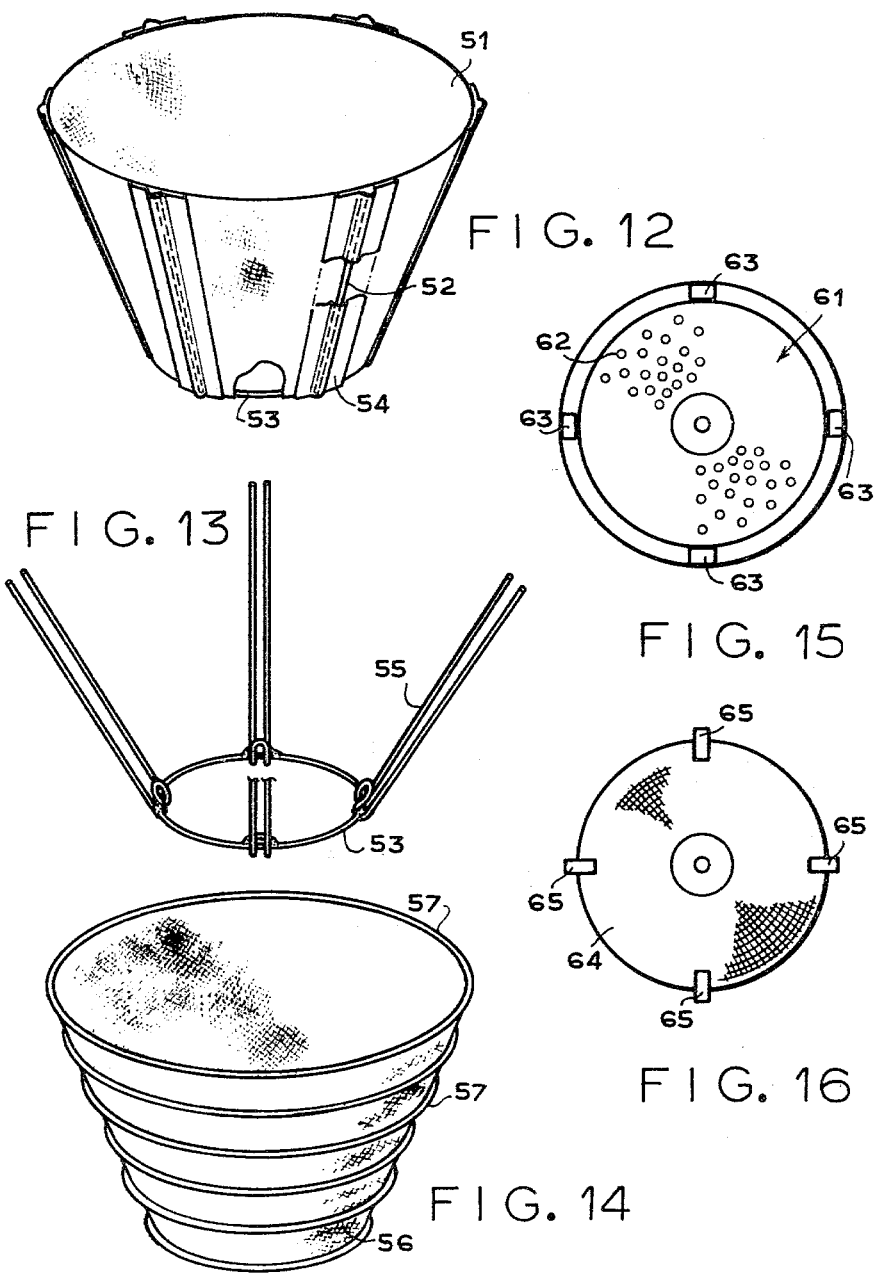

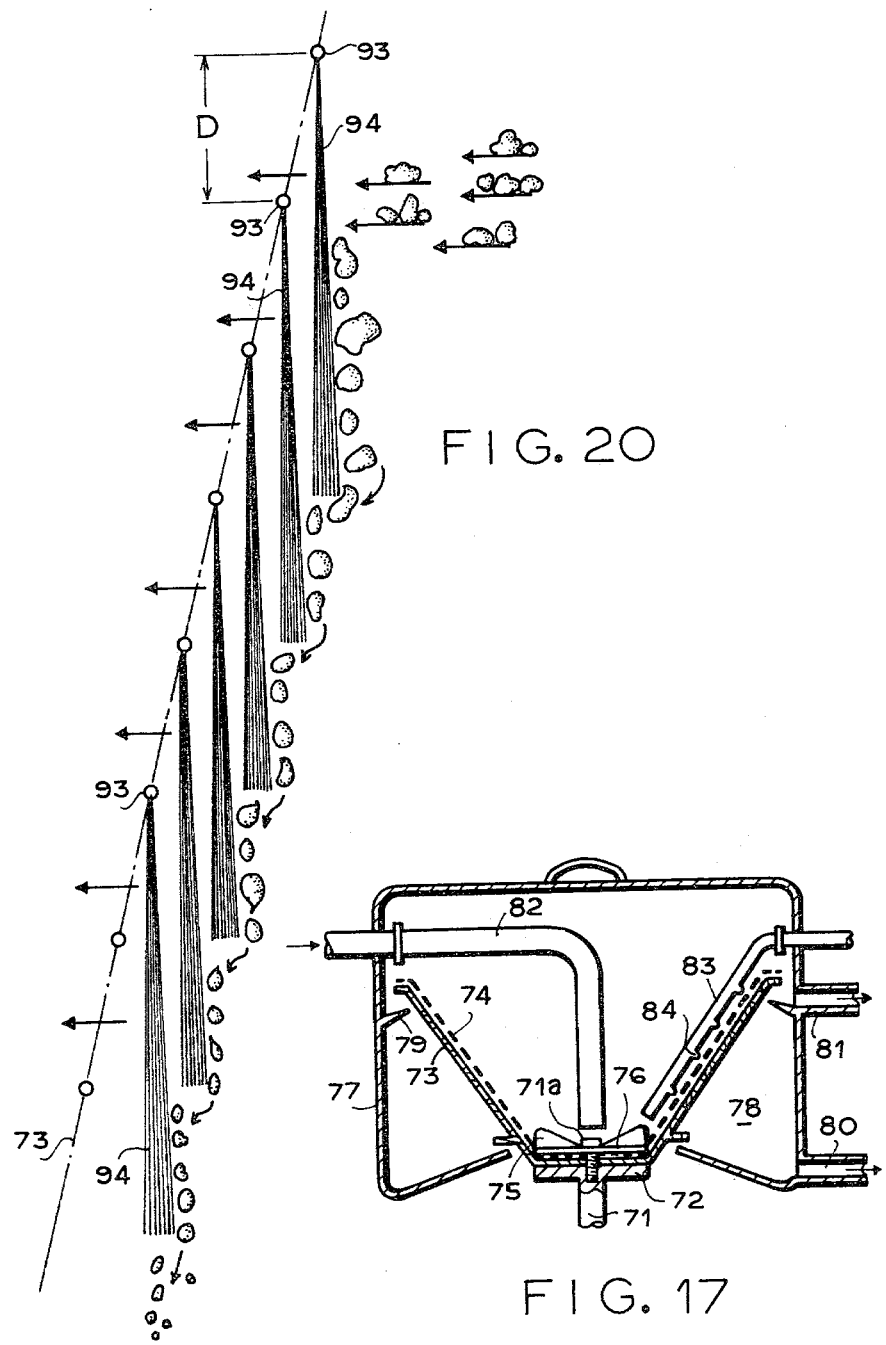

4,302,332

CENTRIFUGAL THICKENER

BACKGROUND OF THE INVENTION

This invention relates to a continuous centrifugal thickener advantageously used to thicken sludges such as waste activated sludge discharged from a sewage treatment system.

A continuous centrifugal thickener provided with a rotary barrel of truncated-cone shape having a filter which prevents a passage of solid particles larger than the desired particle size has already been put for practical use. In a well-known thickener, sludge is continuously fed at a predetermined flow rate within a barrel which rotates at high speed on its own axis. This sludge forms a layer rotating with the filter and moving axially from one end on the small-diameter side to the other end on the large-diameter side on the rotating filter, and during movement thereof, a portion composed of water and small particles, that is filtrate, is released by the action of a centrifugal force outside the barrel passing through the filter while the other portion remaining on the filter, that is thickened sludge, is released from the foremost end of the barrel. The efficiency of thickening depends on the magnitude of the centrifugal force acting on the layer of sludge formed on the filter and mesh of the filter. If these factors are not suitably settled, desired degree of thickening can not be achieved.

SUMMARY OF THE INVENTION

It is an object of the present invention to provide an improved centrifugal thickener in which a materially great treating capacity can be achieved under high degree of thickening.

The centrifugal thickener according to the present invention is characterized by the provision of a truncated-cone shaped rotary barrel having an inner surface positioned on a conical surface having a limited range of semi-vertical angle, and a filter arranged along the inner surface of the rotary barrel and having a limited range of opening size of filter mesh. In the present invention, the vertical angle of the cone is selected within the range from 40° to 80°, and the opening size of the filter mesh is determined from 10 to 40 microns, preferably, 20 to 40 microns. When the rotary barrel is rotated at high speeds together with the filter, sludge fed onto the filter begins to rotate with the filter and forms a layer moving at a suitable speed on the filter, during which effective thickening is carried out.

It is another object of the invention to provide a centrifugal thickener having an easily detachable filter mounted on the rotary barrel.

BRIEF DESCRIPTION OF THE DRAWINGS

FIGS. 2 and 3 are respectively graphic representations showing the relationship between the vertical angle of the rotary barrel and the density of thickened liquid and the relationship between the vertical angle and the recovery rate of solids;

FIG. 8 is a side view of a filter which can be used in the present invention;

FIG. 9 is an enlarged sectional view taken along line A—A of FIG. 8;

FIG. 10 is a plan view showing another filter used in the present invention of which various elements thereof are shown in a developed fashion;

FIG. 11 is a side view showing a further filter which is applied to the present invention;

FIG. 12 is a partially cutaway perspective view of a still further filter;

FIG. 13 is a perspective view of a frame for the filter;

FIG. 14 is a perspective view of another filter;

FIGS. 15 and 16 are plan views respectively showing another rotary barrel and a filter mounted thereon;

FIG. 17 is a sectional view of a further centrifugal thickener of the present invention;

FIG. 20 is a diagram of assistance in explaining the moving state of solids on the filter of the thickener shown in FIG. 18;

DESCRIPTION OF THE PREFERRED EMBODIMENTS

Figure 1:
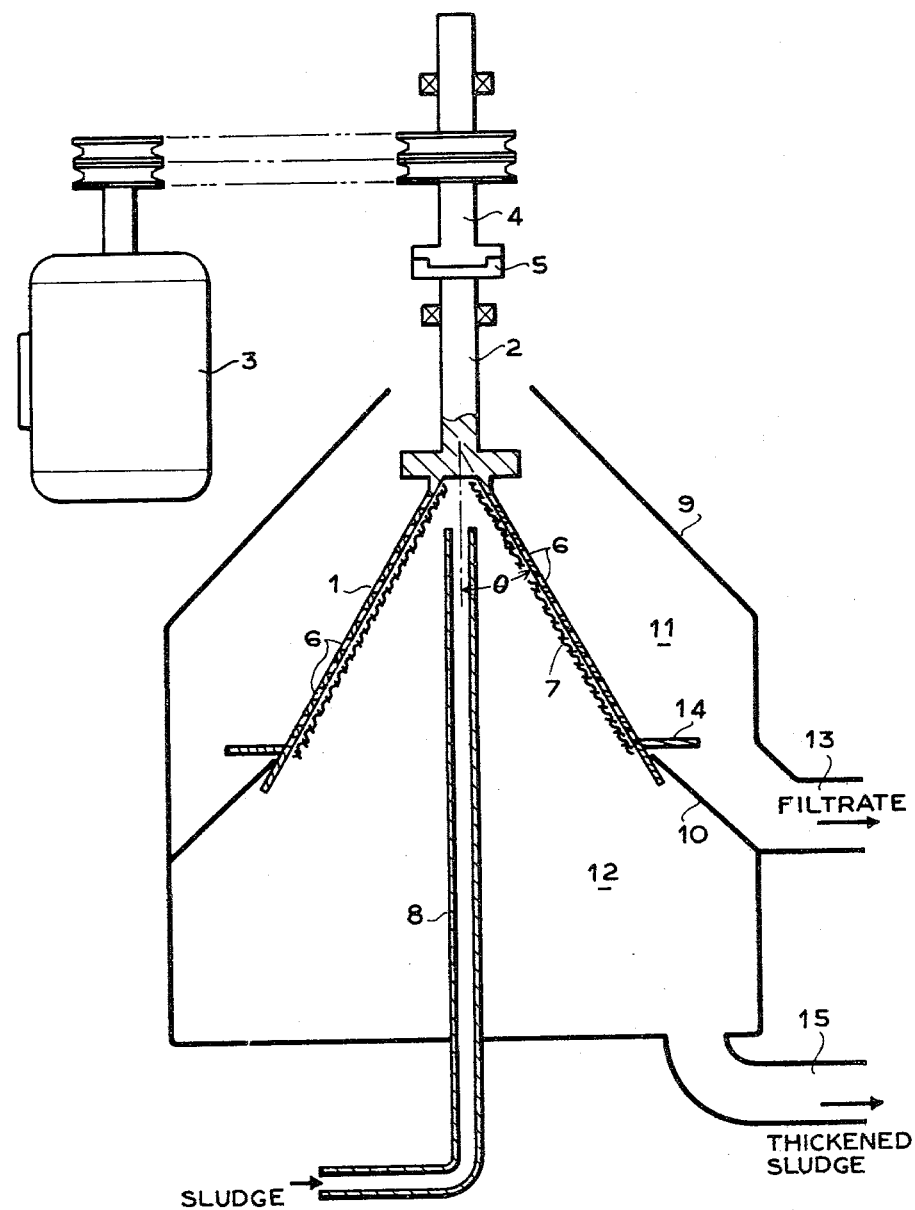
FIG. 1 is a side elevation partially sectioned showing a centrifugal thickener in accordance with the present invention.

Referring now to FIG. 1, a rotary barrel as indicated at 1 has a truncated-cone shape having a vertical angle $\theta$ of 40° to 80°, for example, approximately 60°, and at the top, the barrel is connected integrally with a substantially vertically arranged shaft 2. The shaft 2 is connected through a clutch 5 to a drive shaft 4 connected to an output shaft of a variable speed motor 3 through a belt pulley mechanism. Thus, the rotary barrel 1 is rotated about its axis at high speeds by means of the motor 3. The rotational speed of the rotary barrel 1 is selected to have the value enough to produce an acceleration of a gravity, for example, from 70 to 700 G, required for centrifugal filtration at a position where an internal surface of the rotary barrel is divided such that an upper area thereof is equal to a lower area. If the magnitude of the centrifugal force is less than 70 G, sludge will not thicken effectively. And if it exceeds 700 G, recovery rate will become too low. Since the solid particles of activated sludge are not so hard, the particle which is smaller than the desired size passes through the filter. The rotary barrel 1 is formed with a number of holes 6 which extend through the barrel from its inner surface to the outer surface.

The reference numeral 7 designates a filter disposed along the inner surface of the rotary barrel 1. The filter used in the present embodiment comprises a netting formed of stainless steel wires with openings of 10 to 40 microns, for example, about 25 microns.

A feed pipe 8 is provided to feed a sludge to be thickened towards the filter at the position close to the top of the truncated-cone shaped filter 7.

A housing 9 for accommodating therein the rotary barrel 1 has two chambers 11 and 12 divided by the rotary barrel and a partitioning wall 10. The upper chamber 11 is provided to receive a liquid or filtrate which has passed through the holes 6 in the rotary barrel 1, the filtrate being introduced outside through a passage 13. Preferably, a flange 14, which extends horizontally toward the outside, is provided at the lower end of the rotary barrel 1 in order to prevent the filtrate from flowing into the chamber 12 via a clearance between the rotary barrel 1 and the partitioning wall 10. A thickened sludge remaining on the filter 7 is moved by the action of a centrifugal force in a direction away from the center of rotation of the filter 7 and released from the foremost end of the rotary barrel 1 to the lower chamber 12 for removal thereof through a passage 15.

In the centrifugal thickener shown in FIG. 1, a few rotary barrels of different vertical angle $\theta$ were used to carry out the thickening operation, and the density of the thickened liquid was measured.

FIG. 2 shows curves obtained from the result of plotting, for every rotary barrel, the density of thickened sludge obtained by thickening sludge discharged from a sewage treatment system including waste activated sludge whose bloc size of 20 to 250 microns, averages 100 microns. Three curves shown in FIG. 2 respectively indicate flow rates, 0.5 m³/hr, 1.3 m³/hr and 2.3 m³/hr, of sludge fed from a sludge feed pipe 8 into the rotary barrel 1. The filter used is formed from a netting whose openings are approximately 30 microns by use of stainless steel wires of diameter approximately 30 microns. The centrifugal force applied was approximately 400 G.

FIG. 3 shows the relationship between the vertical angle $\theta$ and the recovery rate, obtained as a result of the above-mentioned experiment.

It is apparent from the results shown in FIGS. 2 and 3 that the vertical angle $\theta$ of the rotary barrel needs to be within the range from approx. 40° to approx. 80°. It has been found from another experiment that the optimum range of the semi-vertical angle $\theta$ is not affected by the opening size of the filter and by the centrifugal force.

Figure 4:
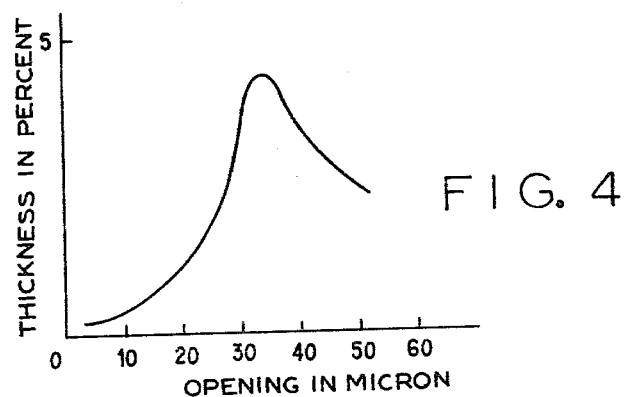
FIGS. 4, 5, and 6 are respectively graphic representations showing the relationship between the opening of the filter mesh and the density of thickened liquid, the relationship between the opening of the filter mesh and the quantity of treatment, and the relationship between the opening of the filter mesh and the recovery rate.
Figure 5:
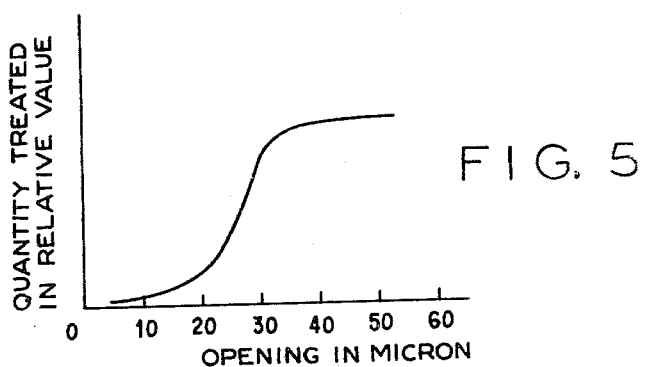
Figure 6:
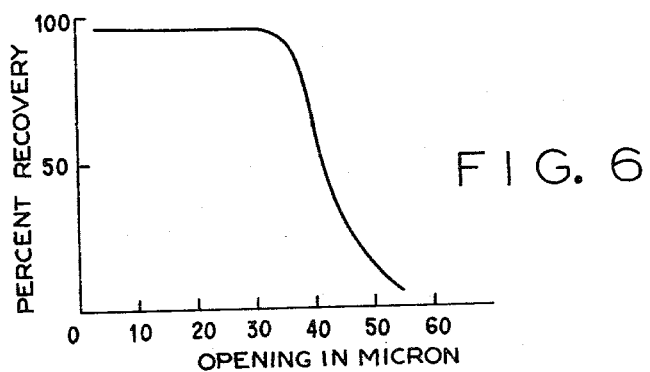

A filter of different opening size was attached to the centrifugal thickener shown in FIG. 1 for accomplishment of a centrifugal thickening experiment similar to that of the foregoing. FIG. 4 shows the relationship between the opening size and the density of thickened sludge, FIG. 5 the relationship between the meshes and the quantity of treatment, and FIG. 6 the relationship between the opening size of the filter and the recovery rate of solid particles. As is apparent from FIGS. 4, 5 and 6, it has a tendency that as the opening size becomes larger, the density increases, but as the opening size exceeds approx. 35 microns, the density decreases. When the opening size exceeds approx. 10 microns, the quantity of treatment increases rapidly. Conversely, when the openings exceed approx. 40 microns, the recovery rate rapidly decreases. This indicates that the optimum centrifugal filtration may be achieved when the openings of the filter are from approx. 10 microns to approx. 40 microns.

Figure 7:
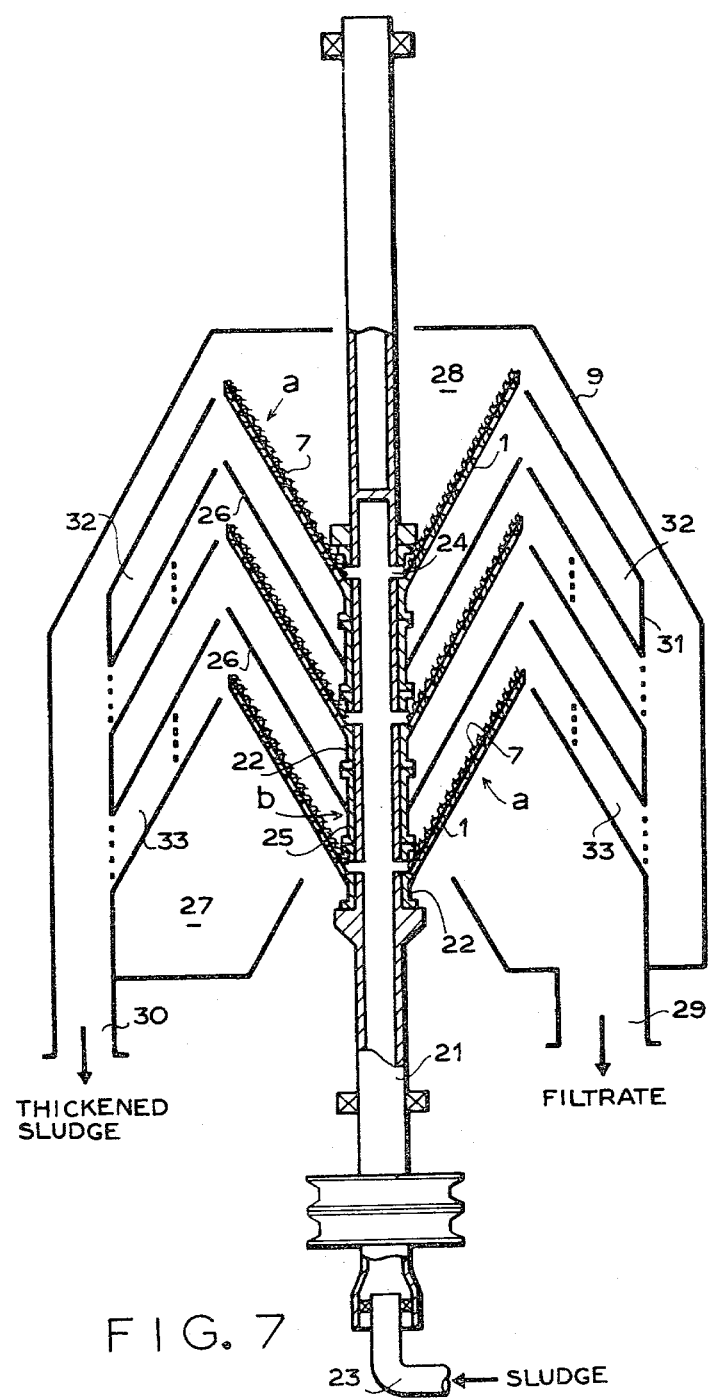
FIG. 7 is a side view partially sectioned showing a different form of a centrifugal thickener in accordance with the present invention.

FIG. 7 shows a modified form of the present invention wherein a substantially vertically arranged cylindrical rotary shaft 21 is connected at its lower end to an output shaft of a motor (not shown) through a belt pulley mechanism and is rotatable on its axis. Supported on the rotary shaft 21 are a plural (three in this embodiment) thickening means a and separating means b arranged between the thickening means. Each thickening means a comprises a pipe 22 having a central hole into which the rotary shaft 21 is inserted, a truncated-cone shaped rotary barrel 1 secured to the pipe 22, and a filter 7 arranged along the internal peripheral surface of the rotary barrel 1, the pipe 22 being formed with a port 24 for introducing sludge, which is fed from a feed pipe 23 into the central hole of the rotary shaft 21, onto the internal peripheral surface of the filter 7. Each separating means b comprises a pipe 25 supported between pipes 22 adjacent to each other, and a truncated-cone shaped separator secured to the pipe 25.

The housing 9 has a first chamber 27 formed externally of the outer peripheral surface of the lowermost rotary barrel 1 and a second chamber 28 formed above the uppermost rotary barrel 1, the first chamber 27 being communicated with a passage 29 for removing a filtrate and the second chamber 28 being communicated with a passage 30 for removing a thickened sludge. Plural partitioning walls 31 arranged within the housing constitute a passage 32 in communication with a chamber formed between each rotary barrel 1 and the separator 26 positioned externally thereof, and a passage 33 formed between each rotary barrel 1 and the separator 26 positioned internally thereof, the first passage 32 being communicated with a passage 33 and the second chamber communicated with a chamber 28.

The sludge is fed from the pipe 23 into the central hole of the hollow shaft 21 and then introduced onto the filter 7 on each rotary barrel 1 through each port 24. On each filter, as in the case of FIG. 1, the sludge begins to rotate with the filter and forms a layer of sludge which flows from the center of rotation toward the outside and is divided by the action of the centrifugal force into a portion passing through the filter and the other portion remaining on the filter. Those having passed through the filter are collected in the chamber 27 through the passage 32 and removed through the passage 29. Those remaining on the filter enter the passage 33 positioned outwardly of the filter from the outward end thereof and removed from the passage 30.

In the embodiment shown in FIG. 7, plural sets of rotary barrels and filters are provided without increasing the volume to a great extent. Accordingly, the apparatus shown in this embodiment, the treating capacity per unit volume is materially great.

FIGS. 8 and 9 show a preferable example of a filter mounted on the rotary barrel. This filter comprises a truncated-cone shaped filter element or filter cloth, four reinforcing frames 42 axially extending on the outer peripheral surface of the filter cloth, and a reinforcing ring 43 extending along the end where the diameter of the filter cloth is small, each of the frames 42 having one end integrally connected to the ring 43. These frames and ring are formed of a material such as polyethylene or polyvinyl chloride and in the form of a web of somewhat high rigidity and they are firmly connected at their inner surface to the filter cloth 41. In a preferred embodiment, the frame 42 and ring 43 are made of synthetic resin. Melted resin coats the predetermined surface of the filter cloth 41, and the resin is joined with the filter cloth in contact therewith during the time when the resin is solidified.

The frame 42 and ring 43 occupy a predetermined position on the surface of the truncated-cone shape by its own rigidity to maintain the filter cloth 41 in its predetermined shape. Accordingly, even if the filter cloth is flexible by which the cloth is not possible to maintain a predetermined shape for itself, the filter may have a shape close to a predetermined truncated-cone shape. Therefore, the filter may be mounted easily on the rotary barrel.

Alternatively, the filter may be in the form in which plural units 44 are interconnected as shown in a developed state in FIG. 10. Each unit comprises a substantially trapezoidal filter element or filter cloth 45 and a frame 46 arranged along the edge thereof, and frames in contact with each other are connected to the unit adjacent thereto by adhesives or welding. In accordance with the aforementioned procedure, a filter having plural regions of different vertical angle may be easily obtained, as shown in FIG. 11.

As previously mentioned, the filter shown in FIGS. 8 to 11 has an advantage that it can be held in a predetermined shape by the rigidity of the frame and ring and has a further advantage that the filter exhibits a good filtration performance by stretching the filter in a circumferential direction when it is rotating together with the rotary barrel. The last mentioned advantage is brought forth by the fact that the frame, having a greater specific gravity than that of the filter cloth, is strongly drawn in a direction away from the center of rotation by the centrifugal force. This effect is further increased in the case where the rotary barrel has a groove that may receive each frame.

In an embodiment shown in FIG. 12, at the external side of the truncated-cone shaped filter cloth 51, plural metal wires or rods 52 (six in this embodiment), are arranged being axially extended, each of the rods 52 being rotatably connected to a ring 53 positioned at the end where the diameter of the filter cloth is small. The rod 52 and ring 53 are held in position in a state where they are interposed between the filter cloth 51 and a tape 54 secured to the outer surface of the filter cloth. Also in this case, the filter cloth 51 maintains its predetermined shape similarly to the filter shown in FIGS. 8 to 11, the filter cloth being stretched in a circumferential direction during rotation. FIG. 13 illustrates an arrangement wherein plural rods 55 having two straight line portions parallel to each other are rotatably mounted.

Alternatively, as shown in FIG. 14, the filter may be of the type in which plural independent rings 57 are secured to the outer surface of the filter cloth. In this case, the filter cloth is stretched by axially drawing each ring 57, which is different from the abovementioned embodiments.

In those embodiments shown in FIGS. 15 and 16, a truncated-cone shaped rotary barrel 61 having a number of through holes 62 has plural first fastener members 63 mounted on the peripheral portion thereof, and a filter 64 has second fastener members 65 in engagement with the first fastener members 63. The first fastener member 63 comprises for example, a web having a number of loops on the surface thereof, and the second fastener member 65 comprises a web having a number of flexible hooks in engagement with the first fastener member 65, which are generally called "Magic Tape". In the state where the first and second fastener members are in engagement with one another, the filter 64 is secured at its peripheral edge portion to the rotary barrel 61, and therefore, when the filter 64 is subjected to the turning force relative to the rotary barrel 61 by means of a frictional force between the suspension liquids, the turning force is held by the fastener members 63 and 65 to prevent the filter from being twisted.

In a further modified form of the invention shown in FIG. 17, a filter 74 is received into a rotary barrel 73 mounted on a mounting seat 72 of a rotary shaft 71. A plate 76 having a blade 75 is arranged within the filter 74, the plate 76 being secured at its center to the rotary barrel by means of a bolt 71a which extends through the filter 74 and the rotary barrel 73 and is threadably inserted into the mounting seat 72. Preferably, the filter 74 is secured at its peripheral edge to fastener members shown in FIGS. 15 and 16. A housing 77 accommodating therein the rotary barrel 73 has a chamber 78 for receiving filtrate having passed through the filter 74 and the rotary barrel 73, and a receiving plate 79 for receiving thickened sludge radially released from the filter, and the filtrate within the chamber 78 is separately removed outside through a pipe 80 and the thickened sludge received on the receiving plate 79 is separately removed outside through a pipe 81.

The pipe 82 for feeding sludge reaches a position close to the plate 76, and thus the sludge released from the pipe 82 is applied with a turning force by the action of the blade 75 which rotates together with the rotary barrel 73, after that the sludge moves onto the filter 74. In other words, the sludge introduced into the rotary barrel begins its rotation in the same direction as that of the filter prior to contacting the filter, and thus the resistance applied to the filter to the rotation may be relieved. When the rotating blade 75 collides with the fed sludge, the blade may function to crush solids contained in the liquid.

The pipe 83 arranged upwardly of the filter 74 has a plurality of nozzles 84 for jetting a flow of water towards the surface of the filter 74.

Figure 19:
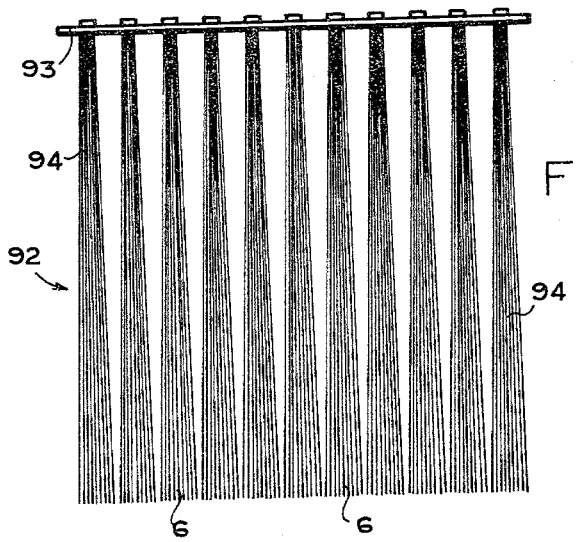
FIG. 19 is a side view showing a part of the filter used in the thickener of FIG. 18.
Figure 18:
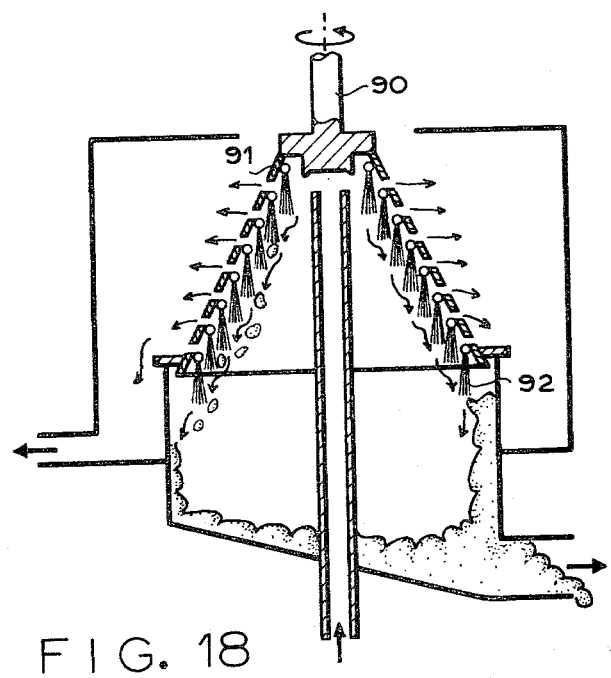
FIG. 18 is a longitudinal sectional view of a modified form of a centrifugal thickener of the present invention.

FIG. 18 shows a still another modified embodiment of the present invention. A rotary barrel 91 mounted on the rotary shaft 90 has a substantially similar construction to those used in the embodiments previously mentioned, but a filter 92 comprises, as shown in FIGS. 19 and 20, a plurality of wires 93 and a number of filament bundles 94 supported on each wire in spaced relation. Each filament bundle 94 is one in which a number of monofilaments of synthetic resin such as polyester are arranged in parallel, each monofilament extending substantially parallel to the axis of the rotary barrel 73 and having the distance longer than the distance D in an axial direction of the rotary barrel between the filaments adjacent to each other. In this embodiment, each filament bundle 94 has a length about three times of the distance D so that each filament bundle overlaps with the adjacent filament at a portion about ⅔ of the length.

In this filter, the sludge moved radially by the action of the centrifugal force, as shown in FIG. 20, is held by the filament bundle 94, and then thickened during movement along the length of the filament bundle 94. The advantage of the filter composed of a number of filaments is that solid particles contained in thickened sludge may be moved smoothly and hence the efficiency of thickening is high and clogging is hard to occur.

Figure 21:
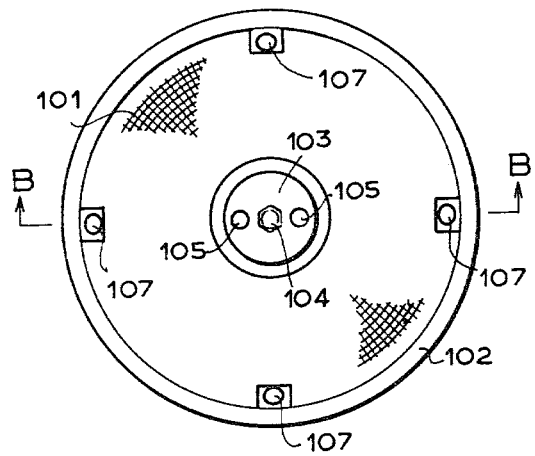
FIG. 21 is a plan view of a rotary barrel and a filter disposed on the thickener in a further embodiment of the present invention.
Figure 23:
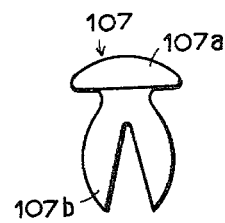
FIG. 23 is a side view of a mounting pin used in the embodiment of FIG. 21.
Figure 22:
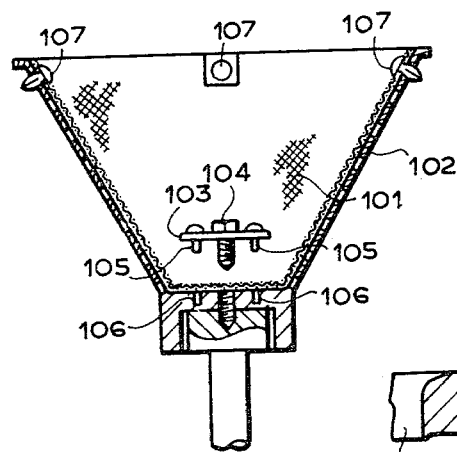
FIG. 22 is a sectional view taken on line B—B of FIG. 21 with a fixing disk and a bolt separated.

The filter may be mounted on the rotary barrel in an easy and positive manner in accordance with the procedure shown in FIGS. 21 and 22. In this embodiment, a filter 101 is secured at its central portion and peripheral edge portion to a rotary barrel 102.

Means for securing the filter, at its central portion, to the rotary barrel comprises a fixing disk 103 and a bolt 104 in which the disk 103 is urged against the rotary barrel to thereby hold the central portion of the filter therebetween. Further, the disk has a pair of locating pins 105 disposed thereon, each pin being extended into a locating hole 106 formed in the rotary barrel 102 thereby controlling positions of the filter 101 and disk 105 with respect to the rotary barrel 102.

Figure 24:
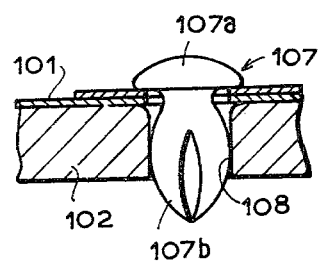
FIG. 24 is a sectional view showing a portion in which the filter is secured to the rotary body by means of said mounting pin.

In order to secure the peripheral edge portion of the filter 101 to the rotary barrel 102, plural mounting pins 107 are used which extend through the filter and into the mounting holes of the rotary barrel. Each mounting pin 107 comprises a head 107a and a leg 107b whose end is divided into a plurality of portions, and is preferably formed by use of injection molding of synthetic resins having a suitable elasticity such as polyethylene. As shown in FIG. 24 in detail, the leg 107b of the mounting pin 107 extends through one of through holes formed in the peripheral edge portion of the filter and is inserted into a mounting hole 108 formed in the rotary barrel. The diameter of the hole 108 is smaller than the maximum diameter of the leg 107b, and thus, the leg is contracted by its own elasticity when it is inserted into the hole 108, and the leg is placed in pressure contact with the inner surface of the hole 108 by strength of stability thereof whereby the leg is secured to the rotary barrel. In this state, the peripheral portion of the filter 101 is secured to the rotary barrel 102 through a plurality of mounting pins 107. The mounting hole 108 can be of a slot having a width slightly smaller than the diameter of the leg 107b of the mounting pin 107.

Figure 25:
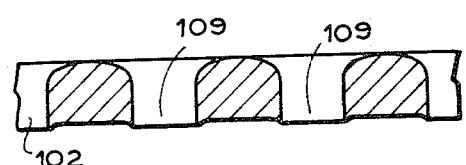
FIG. 25 is a sectional view showing a shape of liquid through-holes formed in a preferable rotary body and FIG. 26 is a sectional view showing the shape of the filter supported on the rotary body of FIG. 25 during the filtering process and the flow of liquid.
Figure 26:
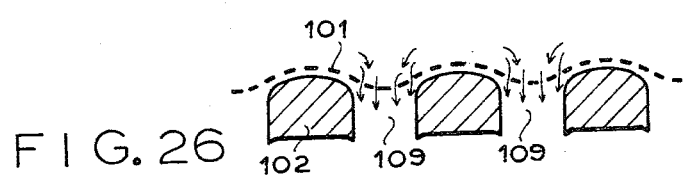

Whatever the type of filter may be used, the rotary barrel must have a number of through holes in order that the filtrate having passed through the filter is permitted to be released from the rotary barrel externally in a radial direction. In the case where the rotary barrel is formed from metal plates, such through holes may be easily formed by a conventional punching technic. The formed through hole may be of a circular shape having a uniform diameter over the entire length from the inner surface to the outer surface of the peripheral wall of the rotary barrel. Or, as shown in FIG. 25, each of the through holes 109 formed in the rotary barrel 102 is preferably provided with a curved surface wherein at the end inwardly of the through hole, the diameter increases towards the foremost end. In the case of the rotary barrel having the through holes of the shape just mentioned, when the filter 101 is strongly urged against the inner surface of the rotary barrel 102 by the centrifugal force, the filter 101 is gently curved along the curved surface formed in the inward end of the through hole 109, as shown in FIG. 26, and the filter is never bent at a sharp angle. As a consequence, the damage given to the filter 101 is materially relieved to extend its service life. Further, the curved surface of the through hole 109 is also useful to increase the efficiency of filtration since the former facilitates smooth movement of the filtrate having passed through the filter 101 into the through holes.

What is claimed is:
1. A centrifugal thickener comprising:
 a. a substantially truncated-cone shaped hollow rotary body,
  a-1. said rotary body having plural liquid through holes which extend from an inner surface to an outer surface thereof,
  a-2. said rotary body having at its inner peripheral surface a vertical angle from 40 to 80 degrees,
 b. a drive mechanism for rotating said rotary body on an axis thereof,
 c. a filter arranged so as to be developed along the inner peripheral surface of said rotary body,
  c-1. said filter having a number of openings in size of 10 to 40 microns,
 d. a feed pipe for feeding sludge into said filter,
 e. a receptacle for receiving a liquid having passed through said filter, and
 f. a receptacle for receiving those liquids remaining on said filter when the former is released from said filter.
2. The thickener according to claim 1 wherein said thickener includes plural rotary bodies, each of said rotary bodies having an extension which extends along the cylindrical surface on the center of the rotational center thereof from the end of the side of maximum diameter of each of said rotary bodies.
3. The thickener according to claims 1 or 2 wherein said plural rotary bodies are provided so that their axes are in coincidence with one another, each rotary body having said filter mounted thereon.
4. The thickener according to claim 1 wherein said filter comprises a netting formed of a stainless steel.
5. The thickener according to claim 1 wherein said filter comprises a number of monofilaments which extend substantially parallel to the axis of a conical body from one side close to an apex of the conical body formed by the internal surface of said rotary body towards the other side.
6. The thickener according to claim 1 wherein said filter is formed of a filter cloth.
7. The thickener according to claim 1 wherein said filter is detachably connected to the outward end of the rotary body by means of fastener members.
8. The thickener according to claim 7 wherein said fastener member comprises a fastener tape.
9. The thickener according to claim 1 wherein said filter is secured at its central portion to a central portion of said rotary body by means of a fixing disk and is secured at its peripheral portion to said rotary body by means of a plurality of mounting pins.
10. The thickener according to claim 1 wherein each of said liquid through holes formed in said rotary body is formed with a curved surface whose diameter successively increases towards the foremost end in the end positioned internally of said rotary body.
11. A centrifugal thickener comprising:
 a. a substantially truncated-cone shaped hollow rotary body,
  a-1. said rotary body having a plurality of liquid through holes which extend from an inner surface to an outer surface thereof,
  a-2. said rotary body having at its inner peripheral surface an angle with the vertical of 40 to 80 degrees,
 b. a drive mechanism for rotating said rotary body on an axis thereof, c. a filter arranged so as to be developed along the inner peripheral surface of said rotary body, c-1. said filter comprising a filter cloth having a number of openings in size of 10 to 40 microns, c-2. said filter having a plurality of mass adding means for stretching said filter resulting from displacement thereof outside by means of a centrifugal force acting during rotation thereof with said rotary body, d. a feed pipe for feeding sludge into said filter, e. a receptacle for receiving a liquid having passed through said filter, and f. a receptacle for receiving those liquids remaining on said filter when the former is released from said filter.

12. The thickener according to claim 11 wherein said mass adding means comprises a ring positioned at the end on the side where said filter cloth has a small diameter, and plural rods which are rotatably connected at one end to said ring and extend with the inside of said filter cloth directed towards the end on the large-diameter side thereof.

13. The thickener according to claim 11 wherein said mass adding means comprises a frame body which extends along a boundary dividing said filter cloth into a plurality of portions.

* * * * *